US009885342B2

(12) United States Patent
Betran Palomas (10) Patent No.: US 9,885,342 B2
(45) Date of Patent: Feb. 6, 2018

(54) ROTATING SYSTEM FOR A WIND TURBINE (71) Applicant: ALSTOM RENOVABLES ESPAÑA, S.L., Barcelona (ES)

(72) Inventor: Jaume Betran Palomas, Sant Cugat Del Vallès (ES)

(73) Assignee: GE Renewable Technologies Wind B.V., Breda (NL)

(*) Notice: Subject to any disclaimer, the term of this patent is extended or adjusted under 35 U.S.C. 154(b) by 1041 days.

(21) Appl. No.: 13/953,686

(22) Filed: Jul. 29, 2013

(65) Prior Publication Data
US 2014/0056709 A1  Feb. 27, 2014

Related U.S. Application Data (60) Provisional application No. 61/719,862, filed on Oct. 29, 2012.

(30) Foreign Application Priority Data

Aug. 27, 2012 (EP) ..................... 12382333

(51) Int. Cl.
F04D 29/046 (2006.01)
F03D 11/00 (2006.01)
(Continued)

(52) U.S. Cl.
CPC ........ *F03D 11/0008* (2013.01); *F03D 7/0224* (2013.01); *F03D 80/70* (2016.05);
(Continued)

(58) Field of Classification Search
CPC ...................................................... F15B 15/12
See application file for complete search history.

(56) References Cited

U.S. PATENT DOCUMENTS 2,475,224 A    7/1949  Deitrickson
2,954,830 A *  10/1960 Gehres ................. B63H 3/081
                                                416/157 A
(Continued)

FOREIGN PATENT DOCUMENTS

DE       20 49 709       4/1971
DE    10 2009 012398     9/2010
(Continued)

OTHER PUBLICATIONS

EP Office Action, dated Oct. 21, 2016.

*Primary Examiner* — Craig Kim
*Assistant Examiner* — Jason Fountain
(74) *Attorney, Agent, or Firm* — Dority & Manning, P.A.

(57) ABSTRACT

Provided are first and second mutually rotatable elements and a bearing arrangement associated therewith including at least one single film-like chamber formed between the first and second elements, a number of fluid injectors for injecting fluid into the hydraulic chamber and a control device for separately controlling the pressure of the fluid injected by the injectors depending at least on loads on the first element or the second element. A driving device is also provided for driving at least one of the elements in rotation, including hydraulic chambers which volume is defined by the relative position of the first and second elements and a pump device for filling the chamber with fluid to rotate the elements.

22 Claims, 6 Drawing Sheets (51) Int. Cl.
*F16C 32/06* (2006.01)
*F03D 7/02* (2006.01)
*F03D 80/70* (2016.01)

(52) U.S. Cl.
CPC ...... *F16C 32/0648* (2013.01); *F05B 2240/53* (2013.01); *F05B 2260/79* (2013.01); *F16C 2300/14* (2013.01); *F16C 2360/31* (2013.01); *Y02E 10/722* (2013.01); *Y02E 10/723* (2013.01)

(56) References Cited

U.S. PATENT DOCUMENTS

| | | | | |
|---|---|---|---|---|
| 3,560,064 | A | * 2/1971 | Silver | F16C 32/0644 384/114 |
| 5,356,225 | A | 10/1994 | Hanes et al. | |
| 5,492,051 | A | * 2/1996 | Schiffler | B60G 21/0555 92/121 |
| 7,874,800 | B2 | * 1/2011 | Kirchner | F03D 1/0658 416/155 |
| 8,079,761 | B1 | * 12/2011 | Wadehn | F16C 32/0648 384/100 |
| 8,105,036 | B2 | * 1/2012 | Munch | F03D 7/0224 415/229 |
| 2009/0148291 | A1 | * 6/2009 | Gerber | F03D 1/0658 416/147 |

FOREIGN PATENT DOCUMENTS

| | | |
|---|---|---|
| GB | 1330317 | 9/1973 |
| JP | 59-166712 | 9/1984 |
| JP | 05-296247 | 11/1993 |

* cited by examiner

FIG. 20

ROTATING SYSTEM FOR A WIND TURBINE

This application claims the benefit of European Patent Application EP 12382333.8 filed on 27 Aug. 2012 and U.S. Provisional Patent Application Ser. No. 61/719,862 filed on 29 Oct. 2012, the disclosures of which are hereby incorporated by reference in their entirety for all purposes.

TECHNICAL FIELD

A rotating system for a wind turbine. This rotating system includes at least first and second mutually rotatable elements and a hydraulic bearing arrangement associated with said elements.

The present rotating system is particularly suitable for, although not limited to, a wind turbine pitch mechanism and in general for rotating systems comprising at least first and second mutually rotatable elements which slow rotational speed, short angular displacement and small relative movement.

A wind turbine provided with said rotating system for rotation of first and second mutually rotatable elements of the wind turbine.

BACKGROUND

Known wind turbines are provided with a number of rotating systems. The blade pitch mechanism is one specific example of such rotating systems.

The rotor of a wind turbine includes a hub and a number of blades that are mounted on the hub. Although in some cases the rotor blades can be directly bolted to the rotor hub and then stalled thereto, the blades are usually attached to the hub through the pitch mechanism.

The pitch mechanism serves the purpose of adjusting the angle of attack of the blades according to the wind speed in order to control the hub rotational speed. This is carried out by rotating each blade around its longitudinal axis, that is, the axis extending from the blade root to the blade tip.

The rotational orientation of the blades for adjusting their angle of attack allows the load on the blades to be controlled. By controlling the blade pitch angle at any given value the hub rotational speed can be suitably controlled according to specific power production requirements.

Adjusting the angle of attack of the blades also serves the purpose of performing a rotor braking function. This is achieved by moving the blades through the wind turbine pitch mechanism into a blade feather position for protecting the blades from damages and wear which could lead to malfunction.

Known wind turbine pitch mechanisms typically include a pitch bearing. The pitch bearing is arranged between the rotor hub and the rotor blade for ensuring proper rotation of the rotor blade relative to the hub as stated above.

The pitch bearing generally includes a number of rows, such as two or three, of rolling elements, usually balls. The rolling elements transfer the torque from the blades to the hub and withstand the operating working loads. The pitch bearing further includes a number of bearing races, such as two: an outer, larger race bearing, and an inner, smaller bearing race. The rolling elements of the pitch bearing are provided between said bearing races.

In a pitch bearing of a common wind turbine pitch mechanism, one of the pitch bearing races, e.g. the outer bearing race, is connected to the hub, while the other pitch bearing race, e.g. the inner bearing race, is connected to a blade root portion (or sometimes to an extender).

As it is known, the angular displacement in blade pitching is small. The pitch mechanism of a wind turbine allows the blade to be rotated around its longitudinal axis from 0° to 90°. When the wind turbine is operating in normal conditions the blade pitch angle may range from about 0° to about 25° depending on the wind speed and therefore the power. When the wind speed is above 25-30 m/s the blade pitch angle may be 90° in order to stop the wind turbine rotor to protect the assembly. Therefore, not all of the rolling elements in common wind turbine pitch mechanisms are fully used.

When rotor blades are rotated through known pitch mechanisms high radial forces are generated. This results in high wear on the teeth of the drive pinion and the annular gear of the pitch mechanism. Loads are concentrated on specific areas of the bearing races which may lead to failure.

Bearings base their behaviour on very small contact regions, namely those of the rolling elements with the bearing races. Bigger bearings will be slenderer and therefore bigger deformations will be generated. This can undesirably compromise good load transmissions between rolling elements and bearing races.

In addition, machining of the balls is complex and materials used are expensive. Since blades are increasingly larger and heavier, larger bearings are required in terms of height and/or diameter. For example, in an offshore wind turbine, the diameter of the blades is of about 3 meters. Increasing the size of the bearings would result in an increase of the global size and therefore transport problems could arise. Increasing the size of the bearings would also result in greater deformations thus hampering transmission of the movement.

Bearings in common wind turbine pitch mechanisms comprising rolling elements are therefore not optimal.

As an alternative, plain bearings have been also proposed. They consist in providing first and second mutually rotatable elements, such as for example the hub and blade, or portions thereof, in a wind turbine pitch mechanism, with a layer of a hydraulic fluid film disposed therebetween such that the surfaces of said first and second elements slide against each other. Therefore, plain bearings do not make use of rolling elements.

U.S. Pat. No. 8,079,761 discloses the use of a plain bearing in a wind turbine rotor. The rotor bearing includes a main shaft capable of rotating relative to a bearing surface. A single fluid film is provided between the bearing surface and the main rotary shaft as well as a pump device. This allows the plain bearing to be selectively operated in hydrodynamic and hydrostatic modes.

However, the above solution is specifically intended for rotation of two elements in full turns and at high speeds. Working loads on such bearings are thus uniform on the inner bearing race. The variable action of the gravity has to be foreseen in this case for each angular position of the wind turbine rotor blades. The variable action of the wind speed which results in highly variable working loads must be also taken into account. The term variable as used herein relating to load vectors does not only refers to modules but also to directions.

The bearing disclosed in this document is therefore not suitable for small angle axial displacements in wind turbine applications. This bearing is not suitable for small displacements travelled at slow speeds combined with variable loads. This is because part of such bearing remains stationary so it does not change its position together with the substantially continuous movement of the bearing when in use. This solution does not provide the accurate high control of the rotating parts in a wind turbine when in use. This is very important since the blades are subjected to 3D movements derived from blade rotation and blade pitch combined movements.

There is therefore a need for a rotating system that can be used, for example, in a pitch blade mechanism, and/or other rotating parts in wind turbine applications, which can at least mitigate the above disclosed disadvantages.

The present rotating assembly is directed to rotating systems such as the pitch mechanism of a wind turbine which allows the above disadvantages to be at least mitigated.

SUMMARY

A rotating system for a wind turbine and a wind turbine including such a rotating system.

The present rotating system for a wind turbine includes first and second mutually rotatable elements and a hydraulic bearing arrangement associated with said elements. In the specific implementation in which the rotating system is applied to the pitch blade mechanism in a wind turbine, the first and second mutually rotatable elements correspond to the blade and the hub of the wind turbine rotor, respectively.

The present hydraulic bearing further includes at least one hydraulic chamber. The hydraulic chamber or hydraulic chambers are formed between the first and the second elements.

A number of fluid injectors are also provided. The injectors are configured for injecting fluid into the chambers. A control device is further provided for separately controlling the pressure of the fluid injected by the injectors. The pressure of the fluid supplied by the injectors is thus controlled separately and their values can be varied depending on at least loads on the first or the second element. The control of the pressure supplied by the injectors allows the radial distance between the first and second mutually rotatable elements to be accurately varied. In a practical case, this is performed by injecting more or less quantity of oil into a particular chamber. Concentration of radial loads can be highly reduced by the provision of a number of injectors working simultaneously and controlled separately.

The provision of a number of injectors distributed around the length of the first and second elements is highly advantageous. The relative movement between the blade and the hub in a pitch bearing is very small, such as of the order of several degrees. This small relative movement occurs from a given wind speed value. When this relative movement takes place, the relative angular speed is very slow, of the order of 5 degrees per second. The provision of a number of injectors working simultaneously and controlled separately has the advantage that the film of hydraulic fluid between the blade and the hub is continuous. This also allows to compensate for the action of the gravity in the blade changing angular position. By providing several injectors for injecting fluid into the chambers the bearing races are prevented from being contacted to each other when in use.

The separate control of the injectors allows different values of pressure to be supplied. This allows total working loads on the bearing to be reduced in specific areas of the pitch bearing.

This allows working loads in specific areas of the bearing to be reduced thus reducing wear and damages. This is important since as the blades are rotating, the portion of the blades under higher loads is varied so that more tensions are generated on a particular portion of the bearing. When a blade is in a horizontal position the bearing is not subjected to the same loads that when they are in a vertical position. Since these positions are predictable, the pressure of the fluid supplied by the injectors is varied depending on at least loads on the first or the second element according to said blade positions. In general, the fluid pressure inside the chamber can be controlled depending on at least one of the parameters relating to weight of the rotor elements, wind loads, blade azimuth position and blade pitch angle, etc. By increasing the pressure of the fluid supplied by the injectors in those regions subjected to higher loads a better load compensation can be achieved avoiding the bearing races to contact each other.

In some implementations of the present rotating system, a single film-like chamber is formed between the first and second elements. This allows their relative rotation to be facilitated. In advantageous implementations of the rotating system, the injectors may be provided distributed along the entire perimeter of the first and second elements.

The control device may be configured for controlling at least one hydraulic pump associated with at least one of the injectors. However, each of the injectors themselves could be configured for adjusting the pressure of the fluid injected into the chambers. Fluid film pressure values can be varied through the control device in each region of the pitch bearing according to the position of the blades (azimuth), the pitch angle and the wind loads on the blade (closely related to wind speed).

The present rotating system may further include a driving device for driving at least one of said elements in rotation. The driving device may include a motor device, for example including an electric servomotor, for driving a ring gear and pinion assembly. In the particular case of a pitch mechanism, the driving device is to be referred to as pitch drive. In this case, the ring gear is attached to the inner bearing race of the pitch bearing such that rotation of the inner bearing race causes rotation of the outer bearing race and thus rotation of the rotor blade attached thereto. This causes the blade pitch angle to be varied. The pitch drive therefore actively rotates the blades along their longitudinal axes for their accurate angular positioning in order to adjust the angle of attack as stated above.

As an advantageous alternative to the above motor driven pitch drive, a hydraulic driving device may be provided for driving at least one of said two mutually rotatable elements in rotation. The hydraulic driving device includes at least one hydraulic chamber. The volume of the hydraulic chamber is defined by the relative position of the first and second elements in the plane of rotation. The plane of rotation here is a plane arranged substantially at a right angle to the axis of rotation of both elements. Therefore, depending on the relative angular rotation of the first and second elements and hence the angular distance between the first and second portions, the hydraulic chamber or hydraulic chambers will have a greater or smaller volume. As a consequence of such arrangement, expansion of at least one of the hydraulic chambers causes the elements to be rotated to each other.

In one specific implementation of the present rotating system, the volume of hydraulic chamber is defined by at least a first portion of the first element and a second portion of the second element. The portions of the first element and the second element may be a protrusion thereof extending in opposite directions to each other, respectively In an alternative implementation of this rotating system, the hydraulic chamber can be defined by the space between at least two mutually spaced apart portions of one of the first and second elements. The mutually spaced apart portions are also in this case protrusions radially extending from the element in question. In this implementation, a respective protruding portion of the other of the first and second elements is allowed to slide inside the hydraulic chamber thus defining corresponding variable volume sub-chambers.

The driving device of the present rotating system further includes a pump device for injecting hydraulic fluid such as oil into the hydraulic chamber for causing the expansion of the hydraulic chamber as stated above. The pump device is part of a hydraulic closed circuit.

The driving device of the present rotating system further includes a control device. The control device is suitable for controlling the pumping device and therefore for accurately controlling rotation of the first and second mutually rotatable elements.

In a blade pitch mechanism, control of time and pressure of fluid injected into the hydraulic chambers allows the blade to be accurately rotated for a precise angle of attack according to the wind speed and thus for efficiently controlling the rotational speed of the hub of the wind turbine according to the conditions and the power requirements. The expansion of the hydraulic chamber causes the blade to be pitched in a controlled manner with no wear of inner parts such gear teeth.

In implementations in which a number of hydraulic chambers are provided, the pump device is arranged connecting two adjacent hydraulic chambers to each other such that fluid is pumped from one hydraulic chamber to another hydraulic chamber. The hydraulic chambers can be grouped in sets of hydraulic chambers. More specifically, the driving device may include a number of sets of chambers covering different angles of the first and second elements. Each set of chambers may have a pump device associated therewith.

All of chambers are capable of covering an angle ranging from 0 to 90 degrees. In some implementations it is preferred that at least one chamber of the sets of chambers may cover an angle ranging from 0 to 24 degrees. These values refer to the angular extension on the perimeter of the first element or the second element. The first and the second elements are typically circular in cross-section.

A single, continuous chamber may be provided where hydraulic pressure may be varied, that is, it can be non-uniform.

Injectors may be distributed around 360° of the periphery of the elements. Injectors may be arranged in rows distributed in an axial direction. Therefore, in the same plane the distance between the elements is not the same but it can be varied in an axial direction.

One of the elements is fitted inside the other of the elements. This is achieved by means of the complimentary shape in cross section of the elements. For example, they may be C-shaped in cross section such that hydraulic chambers are also C-shaped in cross section. This allows both axial and radial contact between both elements to be avoided.

A wind turbine is also provided including the above rotating system. The rotating system in the present wind turbine serves the purpose of facilitating rotation of first and second mutually rotatable elements of the wind turbine.

In some implementations, the rotating system may be at least part of a wind turbine pitch mechanism such that the first element is the rotor hub, or it is associated therewith, and the second element is the rotor blade, or it is associated therewith.

Figure 20:
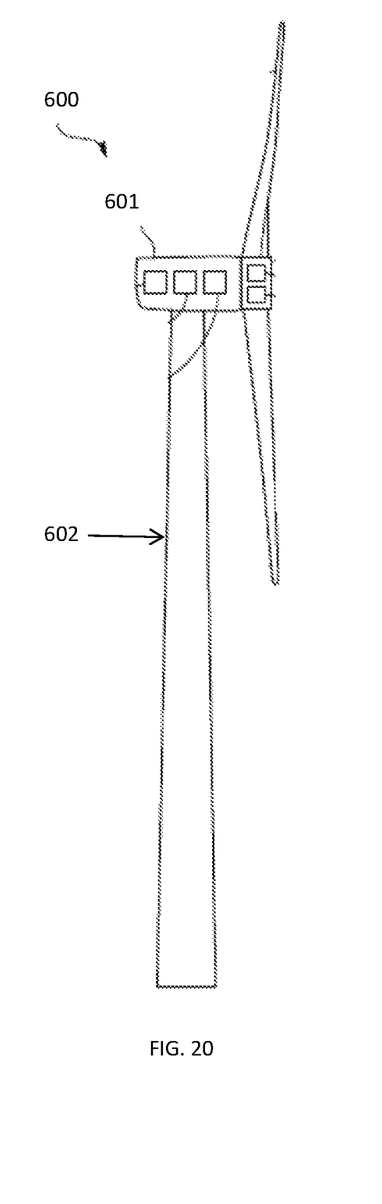
FIG. 20 illustrates a side view of the wind turbine.

In some other implementations, the rotating system may be at least part of the wind turbine 600 yaw mechanism. In this case, the first element is the wind turbine tower 602 or it is associated therewith, and the second element is the wind turbine nacelle 601 or it is associated therewith (see FIG. 20).

The present wind turbine may include a number of rotating systems having a number of driving device arranged at different planes in a pitch mechanism and/or a yaw mechanism in a wind turbine. A suitable sealing device may be also provided with the purpose of preventing leaks of hydraulic fluid from the hydraulic fluid chambers. The sealing device would be preferably associated with the hub, or in general to the one of the elements which is stationary.

Additional objects, advantages and features of implementations of the present rotating system will become apparent to those skilled in the art upon examination of the description, or may be learned by practice of the present disclosure.

BRIEF DESCRIPTION OF THE DRAWINGS

Particular implementations of the present rotating system will be described in the following by way of non-limiting examples. This description is given with reference to the appended drawings, in which.

DETAILED DESCRIPTION

In these Figs. a non-limiting example of a rotating system for a wind turbine is shown. Like reference numerals refer to like parts throughout the description of several views of the drawings.

This rotating system has been indicated as a whole at 100. It can be advantageously used in a wind turbine yaw mechanism for rotation of the blades 300 relative to the hub 200 in a pitch mechanism. However, the disclosed rotating system 100 can be also advantageously used in a wind turbine for rotation of the nacelle relative to the tower a yaw mechanism.

In the implementations shown, the pitch mechanism 100 includes first and second mutually rotatable elements 200, 300, a hydraulic bearing arrangement, referred to as pitch bearing 500 in the following, that is associated with said elements 200, 300, and a driving device, referred to as pitch drive 400 in the following.

The pitch bearing 500 and the pitch drive 400 will be fully described hereinbelow.

In this specific implementation in which the rotating system is part of a wind turbine pitch mechanism 100, the first and second mutually rotatable elements correspond to a blade or a blade portion 300 and a hub or a hub portion 200 of the wind turbine rotor, respectively.

Pitch Bearing

The pitch bearing arrangement is indicated at 500 in the Figs. of the drawings. The pitch bearing 500 in the implementation shown is a hydraulic bearing including a single hydraulic film-like chamber or fluid film 501. The hydraulic chamber 501 is formed between the first and the second elements, that is, between an inner wall 220 of the hub 200 and an outer wall 320 of the blade 300 of the wind turbine. This allows the rotation of the blade 300 relative to the hub 200 to be facilitated when driven. Note that the terms hub 200 and blade 300 may refer to portions or parts thereof.

FIGS. 1-6 show different implementations of the present pitch bearing 500 with different configurations of the hub-blade interface.

Figures 1, 2:
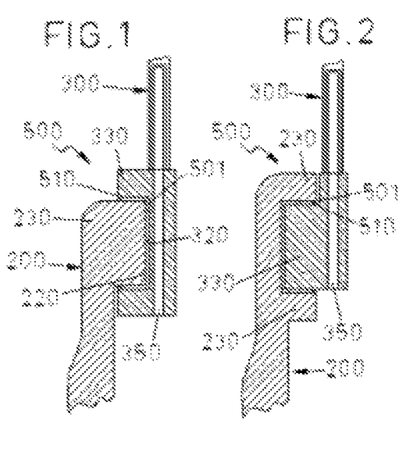
FIGS. 1-9 are fragmentary sectional views of several implementations of the rotating system in which a blade portion and a hub portion are diagrammatically shown.

Specifically, FIGS. 1 and 2 show the fluid film 501 and the blade stud receiving bore 350. In FIG. 1 a portion of the hub 200 is arranged inside a portion of the blade 300. Specifically an end portion 230 of the hub 200 extends into an end portion 330 of the blade 300 to fit therein. In FIG. 2 an inverted implementation is shown where an end portion 330 of the blade 300 is arranged inside an end portion 230 of the hub 200 to fit therein.

Figure 3:
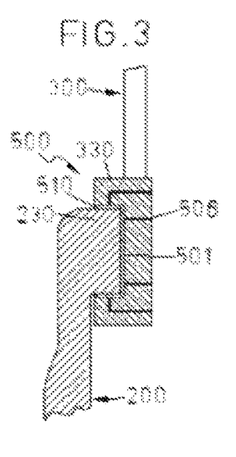

A sealing device 510 in the form of rubber seals is provided attached to the hub 200 for preventing leaks of hydraulic fluid from the fluid film 501 in the hub-blade interface where the end portion of the hub 200 fits into the end portion 330 of the blade 300. In FIG. 3, hydraulic fluid ducts 506 are shown.

Figure 4:
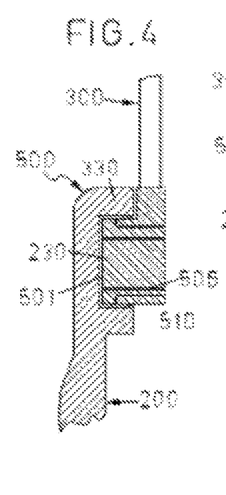
Figure 5:
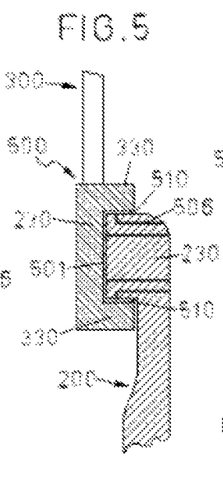

In FIGS. 3 and 4 the hub-blade interface is such that end portion 330 of the blade 300 extends into the end portion of the hub 200 to fit therein. Hydraulic fluid ducts 506 are also shown in FIG. 4. FIG. 5 shows one implementation in which a portion of the blade 300 is arranged outside a portion of the hub 200.

Figure 10:
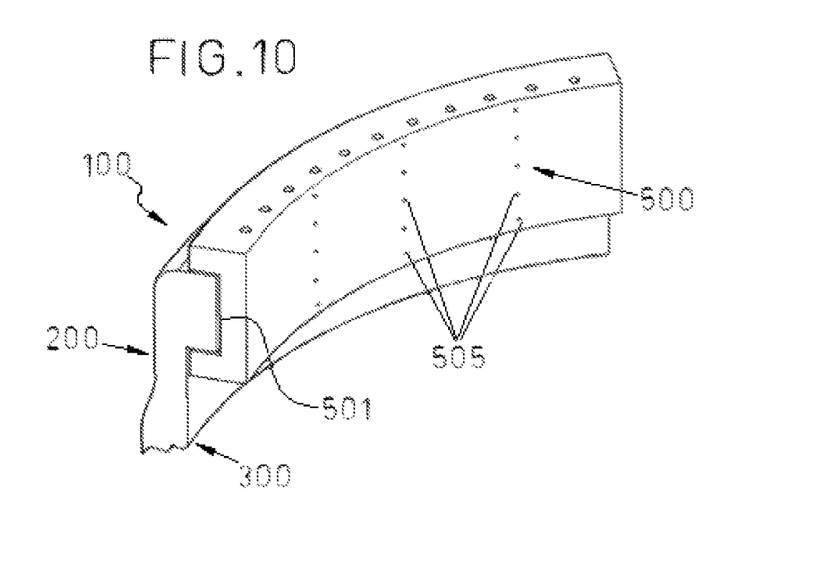
FIGS. 10-12 are schematic partial perspective views of one implementation of a rotating system being part of a wind turbine pitch mechanism.
Figure 11:
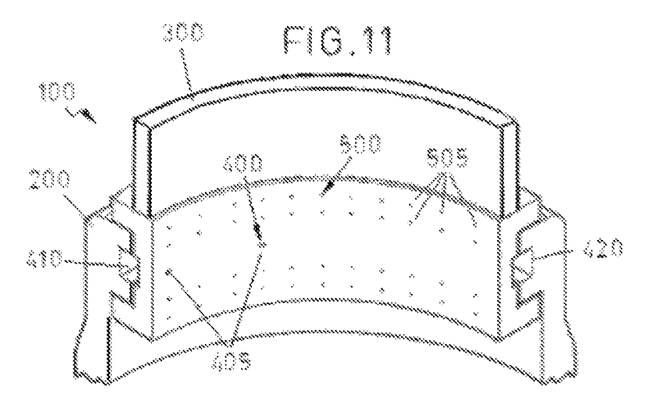
Figure 12:
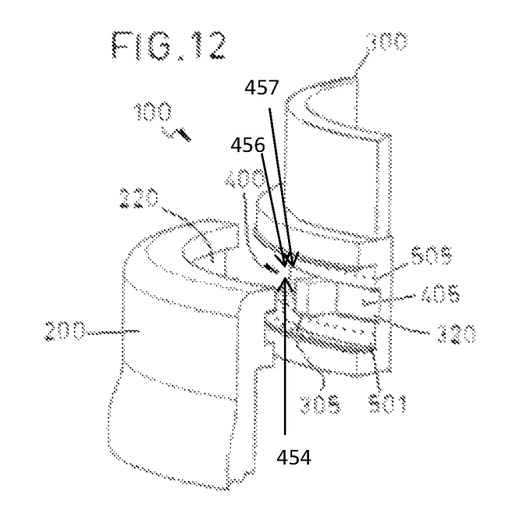

The pitch bearing 500 of the present rotating mechanism 100 includes a number of injectors 505. As shown in FIGS. 10-12, injectors 505 are distributed around the length of one portion of the blade 300, such as a metallic blade extension or adapter. The plurality of injectors 505 are configured for injecting hydraulic fluid such as oil into the hydraulic chamber 501 defined between the hub 200 and the blade 300. Injection of hydraulic fluid through the injectors 505 between the hub 200 and the blade 300 results in a continuous fluid film that is entirely displaced between said parts causing it to be a uniform layer of hydraulic fluid.

A control device is further provided for separately controlling the pressure of the hydraulic fluid injected by the injectors 505. The pressure of the hydraulic fluid supplied by the injectors 505 can be varied through the control device (not shown) depending on at least loads on the rotor hub 200 and the rotor blade 300 of the wind turbine. The injectors 505 are separately controlled in order to advantageously compensate for the action of the gravity in the blade changing angular position while allowing total working loads on the bearing arrangement 500 to be reduced in specific areas thereof. In this respect, the pressure of the fluid supplied by the injectors 505 can be increased in those regions subjected to higher loads. Good load compensation is thus achieved avoiding the elements 200, 300 to contact each other.

The above hydraulic bearing 500 allows net radial loads to be at least reduced on the pitch mechanism avoiding the use of stiffening solutions which are required in known pitch mechanisms. Robustness is thus ensured over deformations of very flexible blades 300 and hubs 200 in a wind turbine.

Pitch Drive

As stated above, the present pitch bearing 500 may be provided with a driving device (pitch drive 400) for driving the blade 300 in rotation relative to the hub 200 of the wind turbine.

Figure 6:
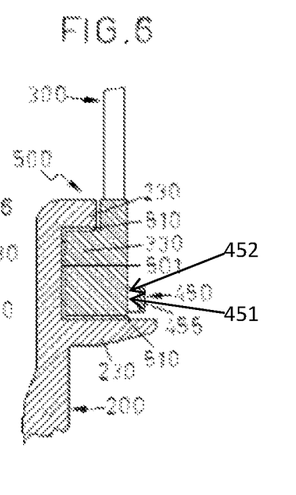

One particular implementation of the pitch drive 400 is shown in FIG. 6. In this implementation, the pitch drive 400 includes a standard driving device 450. Such driving device 450 includes a ring gear and pinion assembly 455. The ring gear and pinion assembly 455 can be motor driven (452) or it can be driven through a hydraulic actuator (not shown).

Figures 7, 8, 9:
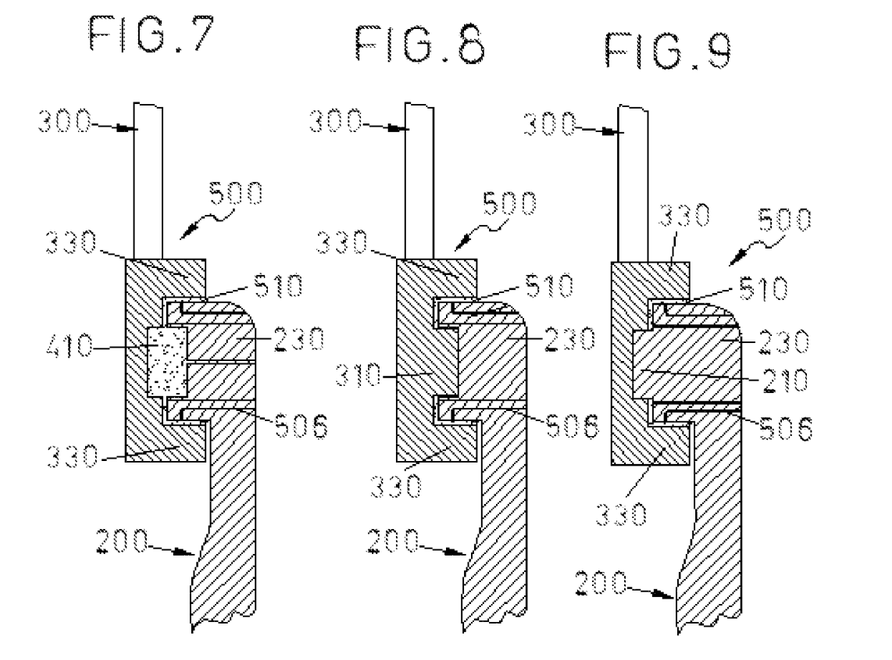

A further, particularly advantageous implementation of the pitch drive is shown in FIGS. 7-9 of the drawings. In this implementation, the pitch drive 400 includes a hydraulic driving device 400. FIGS. 10-19 further shows the implementation of the pitch bearing 500 in FIGS. 7-9 including a hydraulic driving device 400 (which may also include a piston rod 454).

According to FIGS. 7-19, the pitch drive 400 includes a set of three hydraulic chambers 410, 420, 430. Each of these hydraulic chambers 410, 420, 430 are defined by respective protruding portions 205, 210, 215 of the rotor hub 200 and protruding portions 305, 310, 315 of the rotor blade 300.

Figure 14:
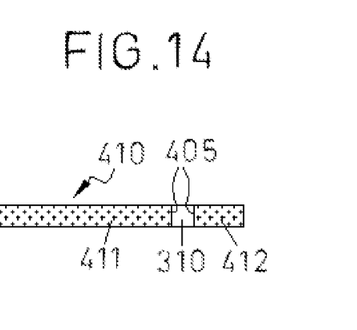
FIG. 14 diagrammatically shows one example of a hydraulic chamber with the protruding portion of the second element (a blade portion of a wind turbine pitch mechanism) dividing the hydraulic chamber into two hydraulic sub-chambers.
Figure 15:
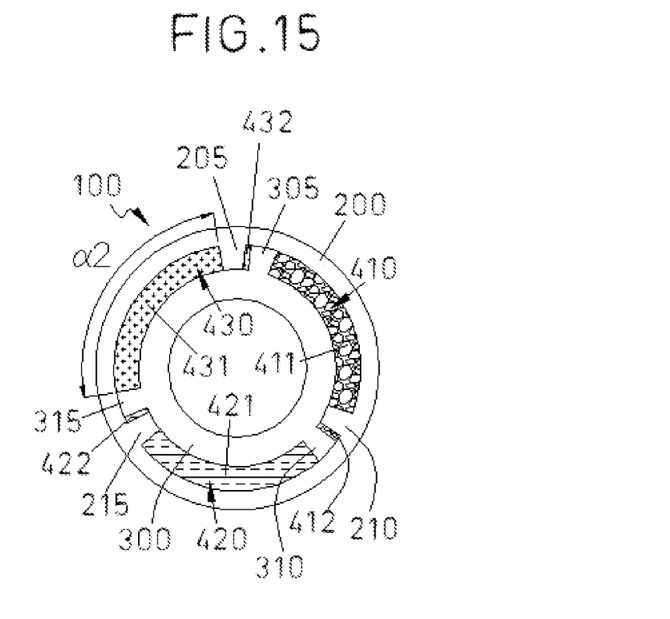
Figure 16:
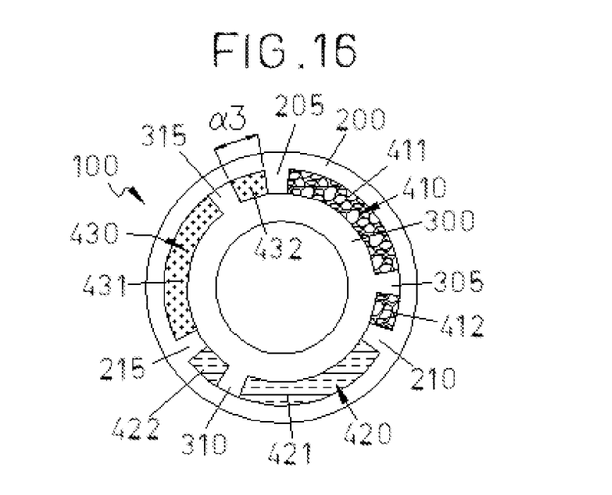
Figure 17:
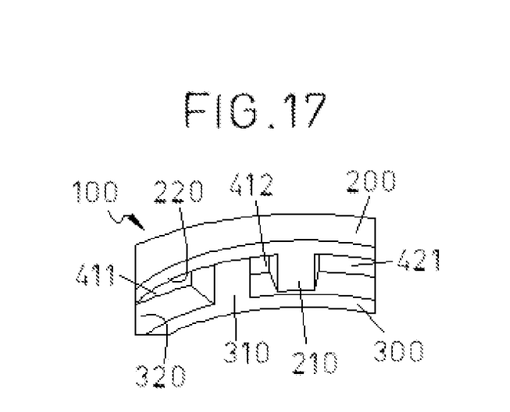
FIGS. 17-19 are partial perspective views of the implementation of the rotating system shown in FIGS. 1-6.
Figure 18:
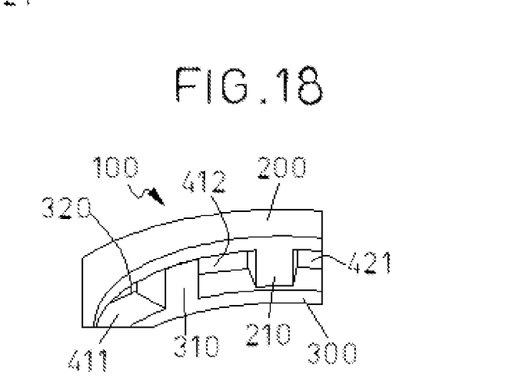

A particular example of the hydraulic chambers 410, 420, 430 will be now described in connection with FIG. 13 only. For the sake of clarity, FIGS. 14-16 show the structure of this implementation of the pitch drive 400 but not all the reference numerals.

Figure 13:
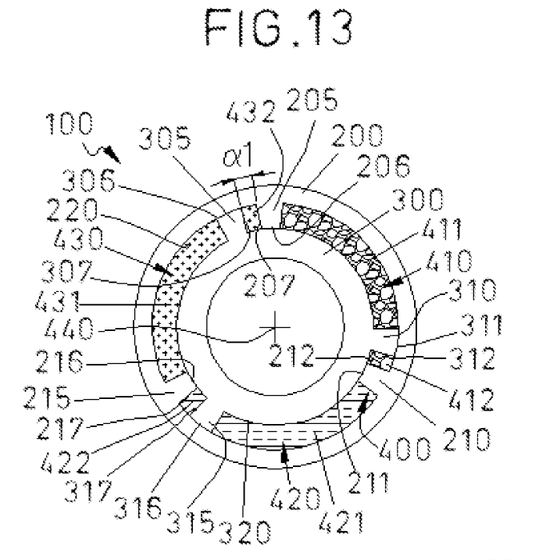
FIGS. 13, 15, 16 are schematic plan views of the rotating system of the implementation in FIGS. 11, 12 in which several relative angular positions of the first and the second elements are shown.

As shown in FIG. 13, the protruding portions 205, 210, 215 extend radially from the hub 200 and the protruding portions 305, 310, 315 extend radially from the blade 300. The protruding portions 305, 310, 315 of the blade 300 extend radially outwards, that is, to the hub 200. The protruding portions 205, 210, 215 of the hub 200 extend radially inwards, that is, to the blade 300. End walls 306, 311, 316 of the protruding portions 305, 310, 315 of the blade 300 are arranged in contact with the inner wall 220 of the hub 200. Likewise, end walls 206, 211, 216 of the protruding portions 205, 210, 215 of the hub 200 are arranged in contact with the outer wall 320 of the blade 300.

Referring now to FIGS. 11-19, hydraulic chambers 410, 420, 430 are provided. The hydraulic chambers 410, 420, 430 are each defined by the space between two mutually spaced apart portions 205-210, 210-215, 215-205 of the hub 200. Specifically, a first hydraulic chamber 410 is defined by the space between adjacent protruding portions 205-210 of the hub 200; a second hydraulic chamber 420 is defined by the space between adjacent protruding portions 210-215 of the hub 200; and a third hydraulic chamber 430 is defined by the space between adjacent protruding portions 215-205 of the hub 200.

As shown in FIGS. 13-16 of the drawings, inside each hydraulic chamber 410, 420, 430 a respective protruding portion 305, 310, 315 of the blade 300 is provided. As the blade 300 rotates relative to the hub 200, the respective protruding portion 305, 310, 315 moves inside the corresponding hydraulic chamber 410, 420, 430. Provision of a protruding portion 305, 310, 315 inside a hydraulic chamber 410, 420, 430 forms variable volume sub-chambers 411, 412, 421, 422, 431, 432, respectively. More specifically, inside the first hydraulic chamber 410, formed by the adjacent protruding portions 205, 210 of the hub 200, a first protruding portion 305 of the blade 300 is movably provided therein defining two corresponding variable volume sub-chambers 411, 412. Likewise, inside the second hydraulic chamber 420, formed by the adjacent protruding portions 210, 215 of the hub, a second protruding portion 310 of the blade 300 is movably provided therein defining two corresponding variable volume sub-chambers 421, 422. Finally, inside the third hydraulic chamber 430, formed by the adjacent protruding portions 215, 205 of the hub, a third protruding portion 315 of the blade 300 is movably provided therein defining two corresponding variable volume sub-chambers 431, 432.

According to the above configuration, the volume of each hydraulic chamber 410, 420, 430 is variable according to the relative position of the rotor hub 200 and the rotor blade 300 and consequently their corresponding protrusions 205, 210, 215 and 305, 310, 315. The relative position of the rotor hub 200 and the rotor blade 300 is defined by an angular displacement α.

Figure 19:
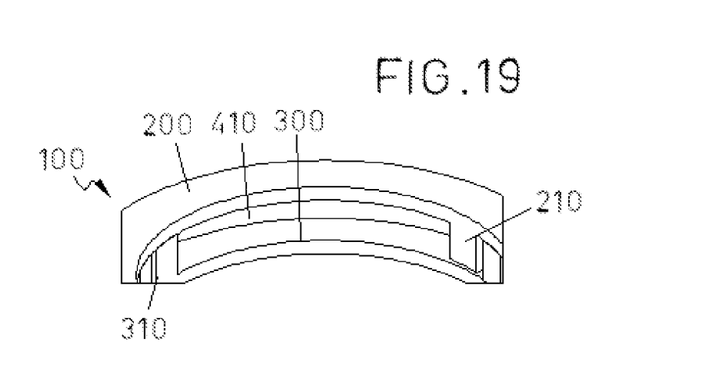

Referring to FIG. 13, the angular displacement α is measured in a plane of rotation parallel to the Figs., or substantially perpendicular to the axis of rotation 440 of the rotor hub 200 and the rotor blade 300. The angular displacement α corresponds to the angular distance between adjacent portions 205, 210, 215 and 305, 310, 315 of the hub 200 and the blade 300, respectively, that is, angular distances 205-305, 210-310, 215-315. More specifically the angle α is defined as the angular distance between one side surface 207, 212, 217 of the portions 205, 210, 215 of the rotor hub 200 and the corresponding side surface 307, 312, 317 of the portions 305, 310, 315 of the rotor blade 300 facing said hub side surfaces 207, 212, 217. This angle α may take values of, for example, $\alpha_1=5$ degrees (FIGS. 13 and 17), $\alpha_3=15$ degrees (FIGS. 15 and 18) or even $\alpha_2=90$ degrees (FIGS. 16 and 19).

Depending on the relative angular displacement α of the rotor hub 200 and the rotor blade 300 the hydraulic chambers 410, 420, 430, 411, 421, 431 and therefore the corresponding sub-chambers 411, 412, 421, 422, 431, 432 will have a greater or smaller volume.

The driving device 400 further includes a pump device 456 including a number of injectors 405. Injectors 405 are suitable for injecting hydraulic fluid such as oil into the hydraulic chambers 410, 420, 430 of the pitch mechanism 100. The pressure at the chambers 410, 420, 430 gives rise to a relative torque between blade 300 and hub 300.

Injectors 405 connect hydraulic sub-chambers 411-412 of chamber 410 in fluid communication to each other. Further injectors 405 connect hydraulic sub-chambers 421-422 of chamber 420 in fluid communication to each other and additional injectors 405 connect hydraulic sub-chambers 431-432 of chamber 430 in fluid communication to each other. Injectors 405 may be independent or common injectors 405. In general hydraulic chambers are connected to each other such that hydraulic fluid is pumped from one hydraulic sub-chamber to another hydraulic sub-chamber.

Injection of hydraulic fluid into the hydraulic chambers 410, 420, 430 through injectors 405 causes some sub-chambers to expand and some sub-chambers to contract (hydraulic fluid is compressed). This involves variations in the value of the angular displacement α. By means of a selective injection of the hydraulic fluid into the sub-chambers 411, 412, 421, 422, 431, 432 the direction of rotation of the blade 300 can be varied. This results in pitching of the blade 300 relative to the hub 200, that is, rotation of the blade 300 around its longitudinal axis (i.e. the axis extending from the blade root to the blade tip). This allows the angle of attack of the blades 300 to be adjusted precisely according to the wind speed in order to efficiently control the rotational speed of the hub 200.

The driving device 450 of the pitch drive 100 further includes a control device (451) for controlling the pumps 457. The control device includes a control unit that allows controlling the fluid that is injected into the hydraulic chambers 410, 420, 430 for accurately controlling the rotation of the hub 200 and the blade 300.

A number of rotating systems 100 having a number of driving devices 450 and/or hydraulic bearings 500 may be provided arranged at different planes, preferably at substantially mutually parallel planes.

Although only a number of particular implementations and examples of the present rotating system have been disclosed herein, it will be understood by those skilled in the art that other alternative implementations and/or uses and obvious modifications as well as equivalents thereof are possible. For example, the present rotating system is applicable both to onshore and offshore wind turbines.

This disclosure covers all possible combinations of the particular implementations described herein. Reference signs related to drawings and placed in parentheses in a claim are solely for attempting to increase the intelligibility of the claim, and shall not be construed as limiting the scope. Thus, the scope of the present disclosure should not be limited by particular implementations, but should be determined only by a fair reading of the claims that follow.

The invention claimed is:

1. A rotating system for a wind turbine, comprising:
first and second mutually rotatable elements and a hydraulic bearing arrangement associated with the first and second mutually rotatable elements,
wherein the hydraulic bearing arrangement includes at least one hydraulic chamber formed between the first and second mutually rotatable elements,
wherein the hydraulic bearing arrangement further includes a number of fluid injectors distributed around a circumference of one of the first or second mutually rotatable elements in a plurality of rows and columns for injecting fluid into the hydraulic chamber and a control device for separately controlling the pressure of the fluid injected by the fluid injectors depending at least on loads on the first rotatable element or the second rotatable element, at least one of the fluid injectors comprising a fluid duct extending partially in a radial direction and partially in an axial direction, and
wherein the first and second mutually rotatable elements have complimentary cross sections in that the fluid injectors are arranged in the plurality of rows and columns distributed in the axial direction such that axial and radial contact between the first and second mutually rotatable elements is avoided.

2. The rotating system of claim 1, wherein the hydraulic chamber includes a single film-like chamber formed between the first element and the second element for facilitating their relative rotation.

3. The rotating system of claim 1, wherein a number of injectors are distributed along the entirety of a perimeter of the first element and the second element.

4. The rotating system of claim 1, wherein the control device is configured for controlling at least one hydraulic pump associated with at least one of the injectors.

5. The rotating system of claim 4, wherein each of the injectors is configured for adjusting a pressure of fluid injected into the hydraulic chamber.

6. The rotating system of claim 1, wherein a fluid pressure inside the chamber is controlled by the control device depending on at least one of the parameters relating to weight of at least one of the of the first element and the second element, wind loads, blade azimuth position and blade pitch angle.

7. The rotating system of claim 1, further including a driving device for driving at least one of the elements in rotation, the driving device including a motor device for driving a ring gear and pinion assembly.

8. The rotating system of claim 1, further including a driving device for driving at least one of the elements in rotation, the driving device including a hydraulic device including a piston rod suitable for causing the first and second elements to be rotated relative to each other.

9. The rotating system of claim 1, further including a driving device for driving at least one of the first and second elements in rotation, the driving device including at least one hydraulic chamber wherein the volume of the hydraulic chamber is defined by the relative position of the first and second elements in a plane of rotation; the driving device further including a pump device for filling the hydraulic chamber with fluid in order to cause the expansion of the chamber such that the first and the second elements are rotated relative to each other, and the control device for controlling the pumping device for controlling rotation of the first and second elements.

10. The rotating system of claim 9, wherein a volume of the hydraulic chamber is defined by at least a first portion of the first element and a second portion of the second element.

11. The rotating system of claim 9, wherein the hydraulic chamber is defined by a space between at least two mutually spaced apart portions of one of the first and second elements; and a respective protruding portion of the other of the first and second elements; the protruding portion being movably provided inside the respective hydraulic chamber to thereby define corresponding variable volume sub-chambers.

12. The rotating system of claim 9, wherein a number of hydraulic chambers are provided and the pump device is arranged to connect two adjacent hydraulic chambers to each other such that fluid is pumped from one hydraulic chamber to another.

13. The rotating system of claim 9, wherein the driving device includes a number of sets of chambers covering different angles (α) of the first and second elements, each set of chambers having a pump device associated therewith.

14. The rotating system of claim 13, wherein at least one chamber of the set of chambers covers an angle (α) ranging from 0 to 90°.

15. The rotating system of claim 1, wherein the first and second elements are counter shaped such that one can be fitted into the other in a way that they remain spaced apart in radial and axial directions when in use.

16. A wind turbine, comprising:
a rotating system for rotation of at least one of a first and second mutually rotatable elements of the wind turbine, the rotating system including a hydraulic bearing arrangement associated with the first and second mutually rotatable elements,
wherein the hydraulic bearing arrangement includes at least one hydraulic chamber formed between the first and second mutually rotatable elements, a number of fluid injectors distributed around a circumference of one of the first or second mutually rotatable elements in a plurality of rows and columns for injecting fluid into the hydraulic chamber and a control device for separately controlling the pressure of fluid injected by the fluid injectors depending at least on loads on the first rotatable element or the second rotatable element, at least one of the fluid injectors comprising a fluid duct extending partially in a radial direction and partially in an axial direction, and
wherein the first and second mutually rotatable elements have complimentary cross sections in that the fluid injectors are arranged in the plurality of rows and columns distributed in an axial direction such that axial and radial contact between the first and second mutually rotatable elements is avoided.

17. The wind turbine of claim 16, wherein the rotating system is at least part of a wind turbine pitch mechanism, the first element being a rotor hub or being associated therewith, and the second element being a rotor blade or being associated therewith.

18. The wind turbine of claim 16, wherein the rotating system is at least part of a wind turbine yaw system, the first element being a wind turbine tower or being associated therewith, and the second element being a wind turbine nacelle or being associated therewith.

19. The wind turbine of claim 16, further including a number of rotating systems having a number of driving devices arranged at different planes.

20. The wind turbine of claim 16, further including a number of rotating systems having a number of bearings arranged at different planes.

21. The wind turbine of claim 16, further including a sealing device for preventing leaks of hydraulic fluid.

22. The rotating system of claim 1, wherein the control device is configured for independently controlling a number of hydraulic pumps associated with corresponding injectors.

* * * * *